Inventor
CHARLES W. EARP
By Percy P. Lantzy
Attorney

FIG.3

United States Patent Office 3,325,811
Patented June 13, 1967

3,325,811
RADIO NAVIGATION SYSTEM
Charles William Earp, London, England, assignor to International Standard Electric Corporation, New York, N.Y., a corporation of Delaware
Filed Dec. 17, 1964, Ser. No. 419,159
Claims priority, application Great Britain, Dec. 24, 1963, 50,881/63
12 Claims. (Cl. 343—105)

This invention relates to radio navigation systems in which one or more co-ordinates of the position of a mobile craft or vehicle are determined by comparing the phase of a signal transmitted from a transmitter in the system with a reference signal in a receiver carried on the mobile craft or vehicle.

According to one aspect of the present invention there is provided a radio navigation system including at least one radio transmitter which radiates a pair of sidebands of a carrier wave, and a receiver distant from the said transmitter having means to receive the pair of sidebands and to obtain therefrom two demodulated signals having a phase difference dependent upon the angular displacement between the carrier wave vector and the resultant of the received sideband vectors, the said receiver also having means to obtain from the received sidebands a demodulated signal having a phase representative of the phase of the difference frequency between the received sidebands.

According to another aspect of the present invention there is provided a radio navigation system including at least one raido beacon arranged to radiate a pair of sidebands of a non-radiated carrier wave, and a mobile station to receive the said sidebands, the mobile station including a carrier wave generator to generate a carrier wave having a fixed phase relationship to the non-radiated carrier wave, a demodulator in which the received sidebands are demodulated by the mobile station carrier wave in such a way as to obtain a pair of demodulate signals corresponding to the received sidebands, the demodulated signals having a phase difference representative of the phase displacement of the resultant of the sideband vectors relative to the carrier wave, and a multiplier wherein the two demodulated signals are beaten together to obtain a beat signal having a phase representative of the phase of the difference frequency between the received sidebands.

My co-pending application, Ser. No. 401,440, filed Oct. 5, 1964, describes a radio navigation system in which a fixed transmitter radiates sidebands of a non-radiated carrier wave and a mobile craft determines its distance from the transmitter by using a locally generated carrier wave to demodulate the received sidebands in such a way as to obtain two demodulated signals having a phase difference dependent upon the phase displacement between the locally generated carrier wave and the resultant of the pair of sidebands. At distances which are greater than the distance equivalent to one-half wavelength of the non-radiated carrier wave the distance measurements are ambiguous.

The present invention aims to overcome this disadvantage by providing a coarse but virtually non-ambiguous distance measurement in addition to a fine but ambiguous measurement.

Embodiments of the invention will now be described with reference to the accompanying drawings in which.

The first embodiment is a V.L.F. rho-rho navigation system, such as loran C or any other hyperbolic navigation system, the principles of which are well known in the art, suitable for aircraft, ships or other mobile craft or vehicles.

Figure 1:
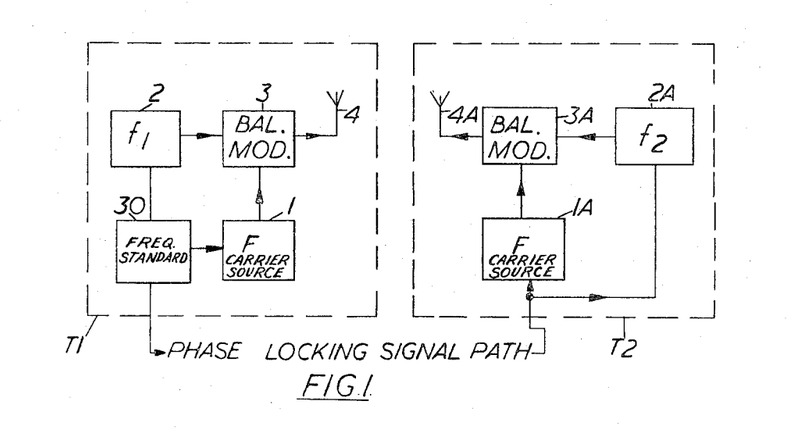
FIG. 1 shows a block schematic diagram of a ground transmitter.

Referring to FIG. 1 of the drawings there is shown a ground transmitter T1 which includes a carrier wave source 1 and a low audio frequency modulating signal source 2, both being connected to a balanced modulator 3. The carrier wave has a frequency F, the audio frequency oscillation wave has a frequency $f_1$, and sidebands of the carrier wave at frequencies $F \pm f_1$ are obtained from the output of the balanced modulator 3, the carrier wave being suppressed. The sidebands at $F \pm f_1$ are radiated by an antenna 4 at the transmitting station.

The carrier wave source and the modulating signal source are both phase-locked to one frequency standard 30 which is controlled by an "atomic clock."

A further ground transmitter T2, similar in essential respect to that shown in FIG. 1 is located at a distant point on the earth's surface. Parts of the transmitter T2 corresponding to parts of transmitter T1 have the same numbers with the addition of A. The ground transmitter T2 radiates a pair of sidebands having frequencies $F \pm f_2$. The carrier wave source 1A and the low audio frequency modulating signal source 2A are phase-locked to the frequency standard at the ground transmitter T1.

Figure 2:
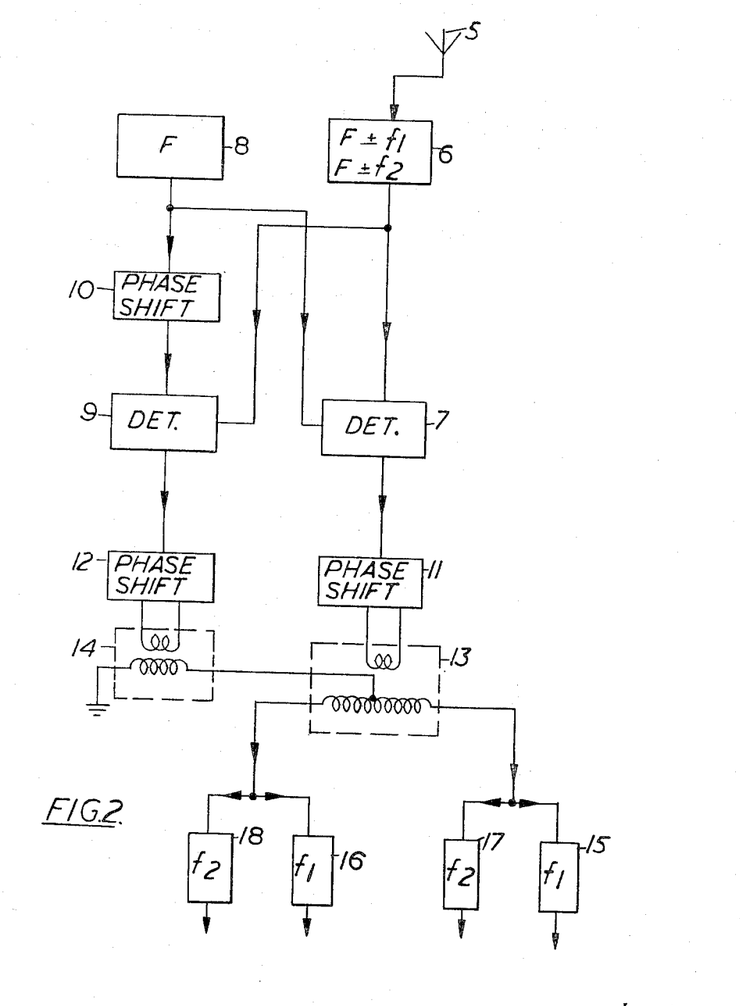
FIG. 2 shows a schematic diagram, partly in block form, of a demodulator arrangement for use in a receiver.

Referring to FIG. 2 there is shown a receiving antenna 5 carried by an aircraft or other mobile craft or vehicle. The antenna 5 is connected to input circuits 6 tuned to the sideband signals at $F \pm f_1$ and $F \pm f_2$. The signals from the output of the input circuits are fed to a demodulator arrangement which includes the apparatus represented by the blocks 7 to 18, inclusive. An amplitude detector circuit 7 is connected to the output of the input circuits 6 and to the output of a local carrier wave source of very high stability. The output of the input circuits 6 is also connected to a further amplitude detector circuit 9, and the output of the carrier wave source 8 is also connected to the detector 9 through a 90-degree phase shift network 10. The outputs of the detector circuits 7 and 9 are connected through complementary phase-shift networks 11 and 12, to the primary windings of transformers 13 and 14, respectively. The secondary winding of the transformer 13 is balanced to ground, and has a center tap which is connected to ground through the secondary winding of the transformer 14.

The output from the carrier wave source 8, is beaten with the received sideband signals at $F \pm f_1$ and $F \pm f_2$ in the amplitude detector 7, and also after a phase shift of 90 degrees, in the amplitude detector 9. The frequency drift of the carrier wave source 8 is so small that its output can be considered to have a substantially constant phase relationship to the carrier sources 1 and 1A on the ground. It is not practicable to phase lock the carrier wave source 8 to the frequency standard 30 to which the phase of the ground carrier wave sources 1 and 1A are locked, but the use of a highly stable frequency standard in the source 8 restricts the relative frequency drift between the ground and mobile carrier-wave sources to not more than about 1 part in $10^{10}$.

From the output of the amplitude detector circuit 7 signals at $f_1$ and $f_2$ are obtained. The amplitude of each of these signals at $f_1$ and $f_2$ varies in dependence upon the angle between the resultant of the vectors representing the corresponding pair of received sideband (at $F \pm f_1$ and $F \pm f_2$) and the vector representing the carrier wave from the source 8. The amplitude of each of the signals at $f_1$ and $f_2$ has a maximum value when the resultant of the corresponding sideband vectors is in line with the carrier vector.

In a purely amplitude modulated signal the vectors representing the sideband signals have a resultant which is always in line with the carrier vector. In the present invention the resultant of the vectors representing the sideband signals received at the mobile craft or vehicle are not necessarily in line with the vector representing the suppressed carrier wave at the ground transmitter. In general there is an angular displacement between the resultant of each pair of sideband vectors and the carrier vector which varies in dependence upon the distance of the receiver from the corresponding ground transmitter.

The sideband signals can be regarded as independent signals and may be represented mathematically by $$\sin 2\pi(F+f)t$$

and $$\sin 2\pi(F-f)t$$

where $f$ is equal to either $f_1$ or $f_2$. The carrier wave generated by the source 8 may be represented by $$\sin (2\pi Ft + \phi)$$

where $\phi$ represents the angular displacement between the vector representing the carrier wave from the source 8 and the resultant of the sideband vectors.

The carrier wave and the sidebands are beaten together in the amplitude detector 7, and the resulting product of the two signals includes the following terms:

$$\cos (\phi - 2\pi ft) - \cos (4\pi Ft - 2\pi ft +)$$
$$+ \cos (\phi + 2\pi ft) - \cos (4\pi Ft + \phi - 2\pi ft)$$

The low frequency terms in the above expression are:

$$\cos (\phi - 2\pi ft) + \cos (2\pi ft + \phi)$$

These terms may be written as:

$$\cos (2\pi ft - \phi) + \cos (2\pi ft + \phi)$$

The carrier-wave fed to the amplitude detector 9 may be represented by:

$$\cos (2\pi Ft + \phi)$$

The carrier wave and the sidebands are beaten together in the amplitude detector 9 and the resulting product of the two signals includes the following low frequency terms.

$$\sin (2\pi ft - \phi) - \sin (2\pi ft + \phi)$$

The output signals from the amplitude detectors 7 and 9 are shifted in phase by 90 degrees relative to each other in the complementary phase shift networks 11 and 12. The low frequency terms from the output of the amplitude detector 9 may be written $$\cos (2\pi ft + \phi) - \cos (2\pi ft - \phi)$$

Adding together the low frequency terms from the outputs of the detectors 7 and 9 gives a single low frequency term $$2[\cos (2\pi ft - \phi)]$$

Subtracting the low frequency terms from the outputs of the detectors 7 and 9 from one another gives a single low frequency term $$2[\cos (2\pi ft - \phi)]$$

The signals at $f_1$ and $f_2$ are obtained from the output of the detector circuits 9 are, since the carrier wave phase has been shifted by 90 degrees, of maximum amplitude when the resultant of the corresponding pair of sideband vectors is in quadrature with the carrier vector.

As previously state the signals at $f_1$ and $f_2$ from the output of the amplitude detector circuit 7 are shifted in phase by 90 degrees relative to the phase of the signals at $f_1$ and $f_2$ from the output of the amplitude detector circuit 9 by means of the complementary phase shift networks 11 and 12. These networks maintain the 90 degree phase difference at both $f_1$ and $f_2$.

The signals at $f_1$ at the primary winding of the transformer 13 includes anti-phase signal voltages across the two halves of the secondary winding of the transformer. To the signal voltages induced in the respective halves of the secondary winding of the transformer 13 is added the signal voltage at $f_1$ from the secondary winding of the transformer 14, to produce sum and difference voltages, respectively, between the outer terminals of the secondary winding of the transformer 13 and ground. The phase difference between the two secondary voltages is dependent upon the relative magnitudes of the signals at $f_1$ applied to the primary windings of the transformers 13 and 14, being 180 degrees when the signal at the primary winding of the transformer 14 is zero, and zero when the signal at the primary winding of the transformer 13 is zero.

In exactly the same manner as described above with reference to the signal at $f_1$, two signal voltages at $f_2$ are produced between the outer terminals of the secondary winding of the transformer 14 and ground. The signals at $f_1$ and $f_2$ from the secondary winding of the transformer 14 are selected by pairs of filters 15 and 16, and 17 and 18, respectively.

The signals at $f_1$ from the output of the filters 15 and 16 differ in phase by an amount which is equal to the differential angular displacement between the vectors representing the received sidebands at $F \pm f_1$ and the vector representing the locally generated carrier. At the ground transmitter radiating the sidebands $F \pm f_1$ the resultant of the sideband vectors is in line with the vectors representing the suppressed carrier wave. At a distance from the transmitter the vectors representing the received sidebands are each displaced angularly with respect to the carrier vector in opposite directions to one another. The amount of the displacement depends upon the distant point from the ground transmitter in terms of the wavelengths of the radiated sidebands. Since the frequency $f_1$ is only a very small fraction of the carrier frequency F, the angular displacements of the sideband vectors are approximately equal and, since they are in opposite directions, the relative angular displacement between the two sideband vectors is approximately twice the angular displacement of any one sideband vector with respect to the carrier wave.

Exactly the same considerations apply to the relationship between the phase difference between the signals at $f_2$ from the filters 17 and 18 and the sidebands at $F \pm f_2$. The distance of the aircraft from each of the ground transmitters may therefore be determined by measuring the phase difference between individual signals of the pairs of signals at $F \pm f_1$ and $F \pm f_2$. In this embodiment of the invention the apparatus used to do this is shown in FIG. 3.

Figure 3:
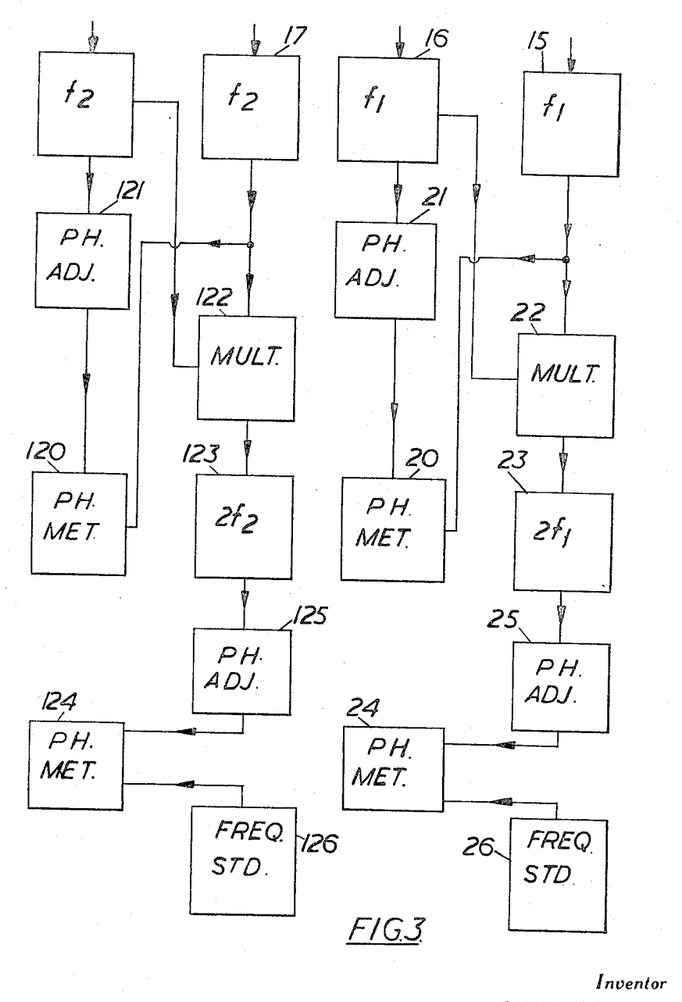
FIG. 3 shows a block schematic diagram of an arrangement in a receiver to provide coarse and fine distance information.

Referring to FIG. 3 there are shown the $f_1$ filters 15 and 16. A phasemeter 20 is connected to the output of the filter 15 and, via an adjustable phase shift network 21, to the output of the filter 16. The phase shift network 21 is initially adjusted for zero phase as read by the phasemeter 21 when two signals which are known to be exactly in phase with one another are fed to the input of the filters 15 and 16. The phasemeter 20 has a scale calibrated in distance and thus indicates the distance of the aircraft from the ground transmitter T1.

As the aircraft moves toward or away from the ground transmitter T1 each of the sideband vectors at $F \pm f_1$ rotates through 180 degrees with respect to the carrier vector over a distance corresponding to one-half wavelength of the radiated sideband. The relative angular displacements between the two signals at $f_1$ is therefore very closely 360 degrees per half wavelength of each of the sidebands. The distance information provided by the phasemeter 20 is therefore ambiguous when the distance of the aircraft from the transmitter exceeds one-half wavelength of each of the transmitted sidebands. If the frequency F of the carrier wave is 50 kc./s. the distance information is ambiguous beyond a range of 3 km.

In order to overcome the ambiguity in the distance information a coarse distance indication is additionally provided in the receiver. The coarse distance indication is provided by beating the two signals at $f_1$ together in a multiplier and comparing the phase of the resultant signal at $2f_1$ with the phase of a second signal at the same frequency from a frequency standard. This is done in the manner now to be described.

A multiplier 22 has two inputs each connected to the output of one of the filters 15 and 16. A filter 23, is connected to the output of the multiplier 22, selects a component at a frequency $2f_1$ from the output of the multiplier. The output of the filter 23 is connected to a phasemeter 24 through a zero-phase adjusting network 25. The phasemeter 24 is also connected to the output of a frequency standard 26 which provides a reference signal at frequency $2f$. The accuracy of the frequency standard 26 must be maintained to the same degree as that of the carrier wave source 8, and in this embodiment the frequency standard is phase-locked to the carrier wave source 8.

The two signals at $f_1$ are mixed together in the multiplier 22, and the phase of the output signal at $2f_1$ from the multiplier is compared with the phase of the signal at $2f_1$ from the frequency standard 26.

The phase of the signal at $2f_1$ from the output of the multiplier 22 varies in dependence upon the position of the aircraft. The phase of the signal at $2f_1$ from the output of the multiplier 21 varies slowly with distance as compared with the respective phases of the signals applied to the phasemeter 20, and will hereinafter be referred to as a "coarse distance signal." The phase of the coarse distance signal is unambiguous over range of distance equal to one wavelength at frequency $2f_1$ e.g. 300 km. if $f_1=500$ c./s.

The phasemeter 24 has a scale calibrated in distance and gives a coarse indication of distance of the aircraft from the ground transmitter T1.

Exactly similar apparatus is used to obtain coarse and fine distance information from the signals at $f_2$. The apparatus in the second channel is represented by the blocks 120, 121 . . . 126 which are identical to the apparatus represented by the blocks 20, 21 . . . 26, except that the multiplier 123 is tuned to $2f_2$ instead of $2f_1$. The phasemeters 120 and 124 respectively provide fine and coarse indications of the distance of the mobile craft or vehicle from the ground transmitter T2.

The position of the aircraft is determined from the indicated distances from the ground transmitters T1 and T2. In applications of the invention in which a single range measurement only is required on the mobile craft or vehicle, only one transmitter radiating a pair of sidebands is required on the ground, and only one demodulated signal channel is required in the receiver.

In systems which provide global coverage a number of ground transmitters is required. Since each of the transmitters radiates a different pair of sidebands the possibility of wave interference does not arise.

Figure 6:
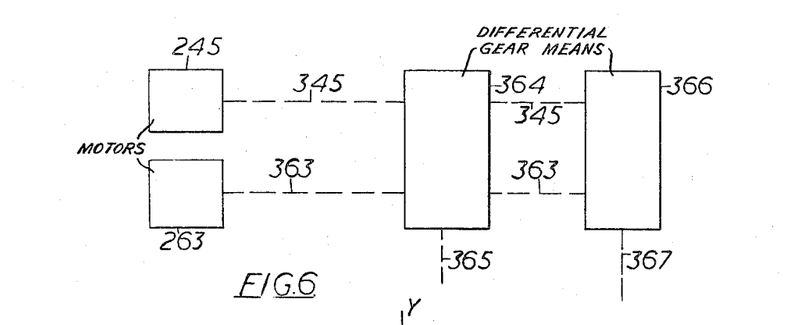
FIG. 6 shows a method of deriving approximate Cartesian co-ordinates of the position of an aircraft, and, FIG. 7, shows a co-ordinate arrangement in a map display.

The second embodiment of the invention to be described is a V.L.F. hyperbolic radio navigation system suitable for aircraft, ships or other mobile craft or vehicles giving area coverage. In the second embodiment four ground transmitters A, B, C, D are situated at the corners of a rectangle ABCD which effectively forms the boundaries of the service area of the system. The arrangement of the ground transmitters is shown in FIG. 6. The transmitters each radiate a pair of sidebands of a common suppressed carrier wave of frequency F, and are allocated frequencies as follows:

| | |
|---|---|
| (A) | $F\pm 10f$ |
| (B) | $F\pm 12f$ |
| (C) | $F\pm 15f$ |
| (D) | $F\pm 18f$ |

When this embodiment of the invention is in a very long range system, $f$ could, for example, be 3 c./s. while F could be, for example 10 kc./s. In systems having shorter ranges it is convenient to use higher values of F up to 2 mc./s. with a corresponding much higher frequency for $f$.

The basic ocnstruction of the ground transmitters is of the same form as that of the transmitter T1 and T2 of the previous embodiment. The frequencies F and $f$ used by the ground stations are phase-locked and are derived from one frequency standard.

Figure 4:
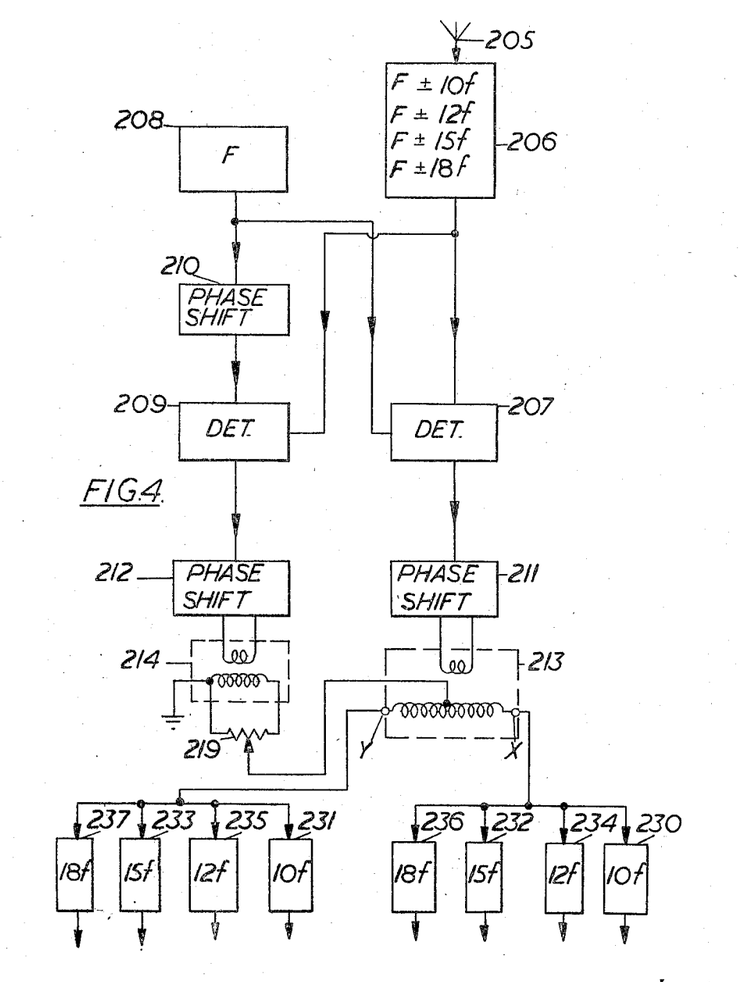
FIG. 4 shows a schematic diagram, partly in block form, of a further demodulator, arrangement for use in a receiver.

The demodulator arrangements on the aircraft receiver are shown in FIG. 4. Each one of the parts numbered 205, 206 . . . 213 represent apparatus which performs a similar function to the apparatus represented by parts numbered 5, 6 . . . 13, respectively, shown in FIG. 3. The input circuits 205 have a pass band wide enough to pass all the received sideband signals. The carrier wave source 208 is a frequency standard, but it does not have to have such a high stability as the carrier wave source 8 in the previous embodiment. This is because the second embodiment of the invention is in a hyperbolic navigation system, and therefore the aircraft on the mobile craft or vehicles is only required to measure the differential distance between the aircraft and two or more pairs of ground transmitters and not an absolute distance measurement. A frequency stability of 1 part in $10^6$ is sufficient for this purpose, and this is obtained by using a quartz crystal-controlled oscillator.

The complementary phase shift networks 211 and 212 maintain a phase difference of 90 degrees between the signals at their respective outputs over the frequency range $10f$ to $18f$. In order to equalize the gain in the signal paths which include the amplitude detectors 207 and 209, respectively, a potentiometer 219 is connected across the secondary winding of the transformer 213, and the potentiometer tap is connected to the centre tap of the secondary winding of the transformer 214.

Signal voltages at $10f$, $12f$, $15f$ and $18f$ are induced between each of the outer terminals, X, Y, of the secondary winding of the transformer 213 and earth. These signals are selected by pairs of filters in the same way as in the previous embodiment of the invention.

Referring again to FIG. 4, the inputs of filters 230, 232, 234 and 236 are connected to terminal X, and the inputs of filters 231, 233, 235 and 237 are connected to terminal Y. The pairs of signals are selected by the filters as follows:

| | $f$ |
|---|---|
| 230 and 231 | 10 |
| 234 and 235 | 12 |
| 232 and 233 | 15 |
| 236 and 237 | 18 |

The phase difference between the signals of each pair is equal to the angular displacement between the vectors representing the corresponding pair of sidebands at the receiver. For example the phase difference between the signals at the respective outputs of the filters 230 and 231 represents the angular displacement between the sidebands at $F\pm 10f$. As mentioned in the previous embodiment of the invention the angular displacement between the vectors representing a pair of sideband signals is a function of the distance of the aircraft from the ground transmitter radiating the particular sidebands. The signals selected by the respective filters of each pair of filters are representative respectively of the upper sideband and the lower sideband signals.

The pairs of signals at $10f$, $12f$, $15f$ and $18f$ are processed in such a way as to extract from them two sets of unambiguous distance measurements from which the co-ordinates of the position of the mobile craft or vehicle are determined. Each of the distance measurements represents the difference between the distances of the aircraft from two of the ground transmitters.

Figure 5:
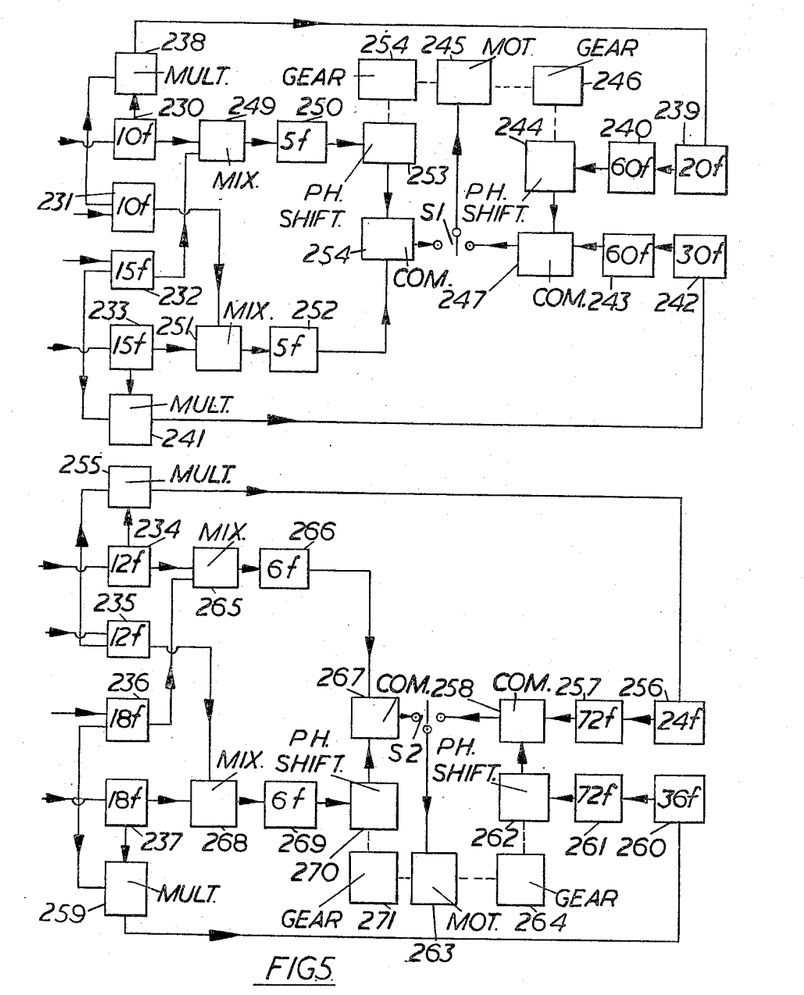
FIG. 5 shows a block schematic diagram of a further arrangement in a receiver to provide coarse and fine distance information.

The apparatus used to measure the difference in the distances between the aircraft and the transmitters A and C will now be described with reference to FIG. 5. Outputs of the filters 230 and 231 are connected to a multiplier 238. A filter 239 selects a signal component at $20f$ from the output of the multiplier 238, and the output from the filter 239 is connected to a multiplier 240 which includes a circuit tuned to $60f$. Outputs of the filters 232 and 233 are connected to a multiplier 241, and a signal component at $30f$ is selected by a filter 242 connected to the output of the multiplier 241. The frequency of the signal at $30f$ is multiplied by a factor of two in a multiplier 243.

The phase of the signal at $20f$ is representative of the phase of the beat signal which would be obtained if the upper and lower sidebands at $F \pm 10f$ were beaten together. Similarly the phase of the signal at $30f$ is representative of the phase of the beat signal between the upper and lower sidebands at $F \pm 15f$.

A coarse, but for practical purposes unambiguous, measurement of the differential distance of the aircraft from the transmitters A and C is obtained by comparing the phases of the two components at $60f$ in the manner now to be described.

The signal from the output of the multiplier 240 is fed to a rotary phase shifter 244 which is mechanically coupled to a motor 245 through a gear drive 246. The signal from the output of the mutliplier 243 is fed to a phase comparator 247, which is connected electrically to the armature of the motor 245 through the switch contact S1. If the two signals at $60f$ are not of predetermined relative phase an error signal is obtained from the output of the phase comparator which causes the motor 245 to turn the phase shifter 244 until balance is obtained in the comparator 247. The angular position of the drive shaft of the motor 245 may be read off in terms of revolutions by a counter.

The phase of the beat between the signals at $F+15f$ and $F-15f$ changes by 360 degrees for each wavelength corresponding to the frequency $30f$. The phase of each of the signal components at $60f$ changes by $2 \times 360$ degress for each wavelength corresponding to the frequency $30f$. Therefore the phase difference between the two signal components at $60f$ changes by $4 \times 360$ degrees for each wavelength corresponding to the frequency $30f$. The lane width of the coarse measurement is therefore $\lambda/4$, where $\lambda$ is the wavelength corresponding to the frequency $30f$. A fine, but ambiguous, measurement of the differential distance of the mobile craft or vehicle from the transmitters A and C is obtained in a manner now to be described. A second output of each of the filters 230 and 232 is connected to a mixer 249. The signals at $10f$ and $15f$ are beaten together in the mixer 249, and the difference frequency component, $5f$, is selected by a filter 250. Similarly a second output of each of the filters 231 and 233 is connected to a mixer 251. A filter 252 selects the frequency component $5f$ from the output of the mixer 251. Then the demodulated signals representative of the upper and lower sidebands received from one transmitter, are beaten respectively with the corresponding signals received from the other transmitter.

The fine measurements of the differential distance of the mobile craft or vehicle from the transmitters A and C is obtained by comparing the phases of the two signals at $5f$. The ambiguity is resolved by reference to the coarse differential distance measurement previously mentioned. The phase comparison of the two signals at $5f$ is obtained in a similar manner to that used to compare the two signals at $60f$, and will now be described.

The output of the filter 250 is connected to a rotary phase shifter 253, which is coupled through a gear drive 254 to the drive shaft of the motor 245. The output from the phase shifter 253 is connected to a phase comparator 254. The output of the filter 252 is connected to a second input of the phase comparator 254. The output of the comparator 254 is connected to the armature of the motor 245 by operating the switch contact S1, and the motor adjusts the rotary phase shifter 253 until a phase balance is obtained in the comparator 247. The respective ratios of the gear drives 254 and 246 are in the ratio of $30f : F$. The angular position of the drive shaft of the motor 245 is read off by a second revolution counter.

The vectors representing the signals at $F+10f$ and $F+5f$ each rotate in opposite directions by 360 degrees for each wavelength corresponding to the frequency F. The phase of each of the beat frequency signals at $5f$ therefore changes by $2 \times 360$ degrees for each wavelength corresponding to the frequency F. The phase difference between each of the beat frequency signals therefore changes by $4 \times 360$ degrees for each wavelength corresponding to the frequency F. The lane width of the fine measurement is therefore $\lambda/4$, where $\lambda$ is the wavelength corresponding to the carrier frequency F.

Similar apparatus to that described above is used to provide coarse and fine measurements of the differential distance of the aircraft from the transmitters B and D. This apparatus will now be described.

The signals from the respective outputs of the filters 234 and 235 are fed to a multiplier 255. A filter 256 selects a signal at $24f$ from the output of the multiplier 255, and the frequency of this signal is further multiplied by a factor of 3 in the multiplier 257, the output of which is connected to a phase comparator 258.

The signals from the respective outputs of the filters 236 and 237 are fed to a multiplier 259. A filter 260 is used to select a signal at $36f$ from the output of the filter 260, and the frequency of this signal is multiplied by a factor of two in a multiplier 261, to the output of which is connected a rotary phase shifter 262. The phase shifter 262 is mechanically coupled to the drive shaft of a motor 263 through a gear train 264. The output from the phase shifter 262 is coupled to the comparator 258. The output from the resolver 258 is connected to the armature of the motor 263 through the switch contact S2. The motor 263 adjusts the rotary phase shifter 262 until a phase balance is obtained in the resolver 258. The coarse differential distance between the aircraft and the transmitters B and D is indicated by a revolution counter connected to the drive shaft of the motor 263.

The fine differential distance information is obtained in the following manner. The respective outputs of the filters 234 and 236 are connected to a mixer 265. A signal at $6f$ is selected from the output of the mixer 265 by a filter 266, the output of which is connected to the input of a phase comparator 267. The respective outputs of the filters 235 and 237 are fed to a mixer 268. A signal at $6f$ is selected by a filter 269 connected to the output of the mixer 268. The output of the filter 269 is connected to a rotary phase shifter 270. The phase of the two signals at $6f$ are compared in a phase comparison arrangement, similar to those described. The phase comparison arrangement includes the phase comparator 267, the rotary phase shifter 270, the motor 263 and a gear train 271, which couples the drive shaft of the motor 263 to the drive shaft of the rotary phase shifter 270, the switch contact S2 connecting the output of the phase comparator 267 to the armature of the motor 263. The respective ratios of the gear trains 271 and 264 are in the ratio $36f : F$.

The angular position of the drive shaft of the motor 245 provides a representation, which for all practical purposes is unambiguous, of a hyperbolic locus of a given differential distance of the mobile from A and C.

Similarly the angular position of the drive shaft of the motor 263 provides a representation, which for all practical purposes is unambiguous, of a hyperbolic locus of a given differential distance of the mobile from B and D.

The hyperbolic co-ordinates defined by angular positions of the motor drive shafts are not convenient for a map display or, directly, for navigation. They are translated to approximate Cartesian co-ordinates by means of the arrangement shown in FIG. 6.

Referring to FIG. 6 there is shown drive shafts 345 and 363 of the motors 245 and 263, respectively. The drive shafts 345 and 363 are coupled to a differential gear arrangement 364 having an output shaft 365, the angular position of which is equal to the difference between the angular positions of the drive shafts 345 and 363. A second differential gear arrangement 366 is coupled to the drive shafts 345 and 363 and has an output shaft 367, the angular positions of which is equal to the sum of the angular positions of the drive shafts. The angular positions of the output shafts 365 and 367 are respectively proportional to angles E and F, where E and F represent the respective angular positions of the drive shafts 345 and 363.

If $D_A$, $D_B$, $D_C$, $D_D$ are the distances from the aircraft to transmitters A, B, C, D respectively, $D_A - D_C$ is proportional to E
$D_B - D_D$ is proportional to F The angular position of the output shaft 365 is therefore representative of $$D_A - D_B - D_C + D_D$$

which is proportional to $(E-F)$.

The angular position of the output shaft 367 is representative of $$D_A + D_B - D_C - D_D$$

which is proportional to $(E+F)$.

Figure 7:
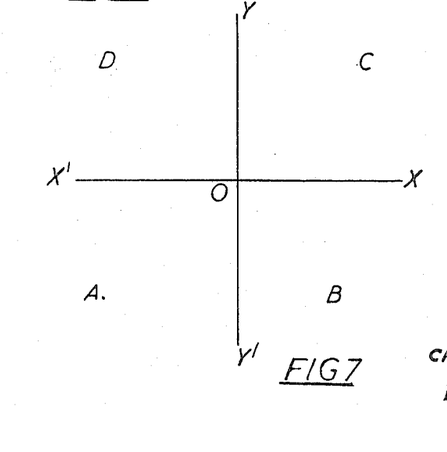

Referring to FIG. 7 if Cartesian co-ordinates are set up within the rectangle ABCD, representing the service area of the navigation system, $E-F$ is approximately proportionate to the X co-ordinate, and $E+F$ to the Y co-ordinate. The plotting of $E-F$ and $E+F$ in Cartesian co-ordinates enables a reasonably uniform map display to be presented to the navigator or pilot without the necessity for a co-ordinate translation computer.

When it is required to provide distance information to craft within a comparatively small area on the ground, for example, taxiing aircraft on an airfield, the sideband signals could be provided from signals carried by a transmission line in the form of a leader cable.

The principles of the invention can also be applied to cases in which the receiving equipment is fixed whilst the transmitting stations are carried by mobile craft. It would, however, necessary for the carrier wave generators of the transmitter to be of a very high order of stability, as previously mentioned. Moreover the carrier waves at each of the transmitting stations in a system must be effectively synchronized with one another.

It is to be understood that the foregoing description of specific examples of this invention is made by way of example only and is not to be considered as a limitation on its scope.

What I claim is:

1. A radio navigation system including at least one radio transmitter which radiates a pair of sidebands of a carrier wave and a receiving station distant from said transmitter, said receiving station including:
   means to receive said pair of sidebands;
   means coupled to said receiver to demodulate said pair of sidebands to obtain two demodulated signals having a phase difference dependent upon the angular displacement between the carrier wave vector and the resultant of the received sideband vectors;
   means coupled to said demodulator to generate a signal having a phase representative of the phase of the difference frequency between said received sidebands;
   a frequency standard; and
   a phase comparator coupled to said frequency standard and to said generating means for comparing the phase of the signals produced by said generating means with the signal output from said frequency standard, the resultant phase difference being representative of the distance of said receiving station from said transmitter.

2. A radio navigation system including at least one radio beacon arranged to radiate a pair of sidebands of an non-radiated carrier wave and a mobile receiving station, said receiving station including:
   means to receive said pair of sidebands;
   a carrier wave generator coupled to said receiving means to locally generate a carrier wave having a fixed phase relationship to said non-radiated carrier wave;
   means coupled to said carrier wave generator to demodulate said pair of sidebands to obtain a pair of demodulated signals having a phase difference representative of the phase displacement of the resultant of the sideband vectors relative to said locally generated carrier wave; and
   means coupled to said demodulator for beating said two demodulated signals together to obtain a beat signal having a phase representative of the phase difference frequency between said received sidebands.

3. A radio navigation system including a plurality of fixed radio beacons, each arranged to radiate a pair of sidebands of a non-radiated carrier wave, said pairs of sidebands being spaced in frequency from said non-radiated carrier wave by different amounts and a mobile receiving station, said receiving station including:
   means to receive said pairs of sidebands;
   means coupled to said receiving means to demodulate said pairs of sidebands to obtain respective pairs of demodulated signals having phase differences dependent upon the respective angular displacements between the carrier wave vector and the resultant of said received sideband vectors;
   a plurality of pairs of filters coupled to said demodulator to select pairs of demodulated signals resulting from the reception of said pairs of sidebands;
   a first phase comparison arrangement coupled to the output of each pair of filters to measure the phase difference between said demodulated signals;
   a plurality of multiplier means, each coupled to the outputs of each pair of filters for beating together the demodulated signals to produce an output signal at twice the frequency of said demodulated signals a source of reference signal; and
   a second phase comparison arrangement coupled to said multiplier means and to said source of reference signal for comparing the phase of the output signal of each said multiplier means with said reference signal.

4. A radio navigation system according to claim 1 which radiates a pair of sidebands of a non-radiated carrier wave and wherein said receiving station further includes a carrier wave generator to locally generate a carrier wave having a fixed phase relationship to the non-radiated carrier wave and means coupling said generating means to said demodulator.

5. A radio navigation system according to claim 4 comprising a plurality of radio transmitters, each arranged to radiate a pair of sidebands of a non-radiated carrier wave, the said pairs of sidebands being spaced in frequency from the non-radiated carrier wave by different amounts.

6. A radio navigation system as claimed in claim 2 wherein the mobile station includes a frequency standard and a phase comparison arrangement for comparing the beat signal with a signal generated by the frequency standard.

7. A radio navigation system as claimed in claim 2 having a plurality of fixed radio beacons each arranged to radiate a pair of sidebands of the non-radiated carrier wave, the said pairs of sidebands being spaced in frequency from the non-radiated carrier wave by different amounts, and means at the mobile station to receive the said sidebands.

8. A radio navigation system as claimed in claim 3 wherein two of the said multiplier means are coupled to the second phase comparison arrangement through respective further multiplier means, the further multiplier means having respective frequency multiplication factors such that the output signals of each of the further multiplier means have the same frequency.

9. A radio navigation system as claimed in claim 3, including at the mobile station at least one pair of mixers, each mixer having an input connected to the output of a respective one of the filters of one pair of filters and to the output of a corresponding filter of the other pair of filters, means to select from the output of each mixer a signal having a frequency equal to the frequency difference between the input signals of the mixer and to feed the said difference frequency signals to the first phase comparison arrangement.

10. A radio navigation system as claimed in claim 9 wherein the first and second phase comparison arrangements include a phase comparator to which are applied the signals to be compared, a rotary phase shifter through which one of the signals to be compared is applied to the phase comparator, and a mechanical coupling between the rotor of the rotary phase shifter and an electric motor electrically coupled to the output of the phase comparator and responsive to the output signal thereof.

11. A radio navigation system as claimed in claim 10 wherein the rotors of the respective rotary phase shifters of the first and second phase comparison arrangements are mechanically coupled to a common electric motor by individual gear trains having respective ratios in the ratio of the frequency of the output signals of the further multiplier means to the frequency of the non-radiated carrier wave.

12. A radio navigation system as claimed in claim 11 having the first and second phase comparison arrangements mechanically coupled to a common electric motor, further first and second phase comparison arrangements mechanically coupled to a further common electric motor, first and second differential gear arrangements each mechanically coupled to the drive shaft of the said common electric motor and to the drive shaft of the said further common electric motor, the first differential gear arrangement being adapted so that the angular position of the output shaft is proportional to the difference between the angular positions of the drive shafts of the said common electric motor and the said further common electric motor, the second differential gear arrangement being adapted so that the angular position of its output shaft is proportional to the sum of the angular positions of the drive shafts of the said common electric motor and the said further common electric motor.

References Cited

UNITED STATES PATENTS

| | | | |
|---|---|---|---|
| 2,930,037 | 3/1960 | Jones | 343—105 |
| 3,158,863 | 11/1964 | White | 343—105 |
| 3,209,356 | 9/1965 | Smith | 343—105 |
| 3,241,139 | 3/1966 | Wadley | 343—12 |

FOREIGN PATENTS 580,224   1/1950   Canada.

RODNEY D. BENNETT, *Primary Examiner.*

CHESTER L. JUSTUS, *Examiner.*

J. P. MORRIS, *Assistant Examiner.*